US009044826B2

(12) United States Patent
Epperlein et al.

(10) Patent No.: US 9,044,826 B2
(45) Date of Patent: Jun. 2, 2015

(54) LASER PROCESSING MACHINES

(71) Applicant: TRUMPF Maschinen Gruesch AG, Gruesch (DE)

(72) Inventors: Peter Epperlein, Ditzingen (DE); Stefan Stroebel, Stuttgart (DE)

(73) Assignee: TRUMPF Maschinen Gruesch AG, Gruesch (CH)

( * ) Notice: Subject to any disclaimer, the term of this patent is extended or adjusted under 35 U.S.C. 154(b) by 15 days.

(21) Appl. No.: 13/647,616

(22) Filed: Oct. 9, 2012

(65) Prior Publication Data

US 2013/0032583 A1 Feb. 7, 2013

Related U.S. Application Data

(63) Continuation of application No. PCT/EP2011/054707, filed on Mar. 28, 2011.

(30) Foreign Application Priority Data

Apr. 9, 2010 (DE) .................... 20 2010 004 852 U

(51) Int. Cl.
| | |
|---|---|
| B23K 26/00 | (2014.01) |
| B23K 26/02 | (2014.01) |
| B23K 26/12 | (2014.01) |
| B23K 26/08 | (2014.01) |
| B23K 37/00 | (2006.01) |
| B23K 37/04 | (2006.01) |

(52) U.S. Cl.
CPC .......... *B23K 26/0876* (2013.01); *B23K 37/003* (2013.01); *B23K 37/0461* (2013.01)

(58) Field of Classification Search
CPC .. B23K 26/12; B23K 37/003; B23K 37/0461; B23K 26/0876

USPC ............ 219/121.65–121.7, 121.78, 121.84, 219/121.86, 121.63, 121.64; 59/78, 78.1; 174/19; 248/51

See application file for complete search history.

(56) References Cited

U.S. PATENT DOCUMENTS 4,063,059 A * 12/1977 Brolund et al. ................ 219/68
4,582,281 A    4/1986 Van Camp
(Continued)

FOREIGN PATENT DOCUMENTS

| DE | 2248037 A1 | 4/1974 |
|---|---|---|
| DE | 2740772 A1 | 3/1979 |

(Continued)

OTHER PUBLICATIONS

International Search Report from corresponding PCT Application No. PCT/EP2011/054707, mailed Nov. 8, 2011, 10 pages.

(Continued)

*Primary Examiner* — Brett Spurlock
(74) *Attorney, Agent, or Firm* — Fish & Richardson P.C.

(57) ABSTRACT

A laser processing machine includes a workpiece support, a movement unit that is movable relative to the workpiece support, the movement unit being configured to move a laser processing head over the workpiece support, and a switch cabinet in which one or more control components of the laser processing machine are provided. An arrangement of the switch cabinet provides a free movement space disposed underneath at least a portion of the switch cabinet, wherein at least a portion of the movement unit is disposed within the free movement space.

16 Claims, 4 Drawing Sheets

(56) References Cited

U.S. PATENT DOCUMENTS

| | | | | |
|---|---|---|---|---|
| 4,659,902 | A | * | 4/1987 | Swensrud et al. ....... 219/121.78 |
| 5,051,558 | A | * | 9/1991 | Sukhman ................. 219/121.68 |
| 5,221,515 | A | * | 6/1993 | Thiebaut et al. ............. 376/261 |
| 5,227,606 | A | * | 7/1993 | Weeks et al. ............. 219/121.67 |
| 5,233,157 | A | * | 8/1993 | Schreiber et al. ........ 219/121.68 |
| 5,304,773 | A | * | 4/1994 | Kilian et al. ............. 219/121.78 |
| 5,338,914 | A | * | 8/1994 | Omote ..................... 219/121.67 |
| 5,574,624 | A | * | 11/1996 | Rennie et al. ................. 361/676 |
| 5,854,460 | A | | 12/1998 | Graf et al. |
| 6,019,359 | A | * | 2/2000 | Fly ............................... 269/293 |
| 6,140,606 | A | * | 10/2000 | Heikilla et al. .......... 219/121.82 |
| 6,300,592 | B1 | * | 10/2001 | Ulrich et al. ............. 219/121.67 |
| 6,376,798 | B1 | * | 4/2002 | Remue et al. ............ 219/121.75 |
| 6,420,674 | B1 | * | 7/2002 | Cole et al. ................ 219/121.67 |
| 6,550,232 | B1 | * | 4/2003 | Achs et al. ..................... 59/78.1 |
| 6,588,738 | B1 | * | 7/2003 | Sukuvaara et al. ........... 269/293 |
| 7,084,368 | B2 | * | 8/2006 | Yamaguchi et al. ..... 219/121.39 |
| 2001/0025715 | A1 | * | 10/2001 | Muller et al. .................... 174/19 |
| 2002/0017512 | A1 | * | 2/2002 | Heyerick et al. ......... 219/121.74 |
| 2002/0121508 | A1 | * | 9/2002 | Remue et al. ............ 219/121.84 |
| 2002/0170889 | A1 | * | 11/2002 | Faitel ....................... 219/121.63 |
| 2003/0058917 | A1 | * | 3/2003 | Benderly ....................... 372/103 |
| 2005/0072768 | A1 | * | 4/2005 | Zeygerman et al. ..... 219/121.67 |
| 2005/0273198 | A1 | * | 12/2005 | Bischoff ......................... 700/248 |
| 2006/0011592 | A1 | * | 1/2006 | Wang et al. .............. 219/121.64 |
| 2006/0060573 | A1 | * | 3/2006 | Becker et al. ............ 219/121.64 |
| 2007/0000888 | A1 | | 1/2007 | Yamazaki et al. |
| 2007/0221639 | A1 | * | 9/2007 | Yoshikawa ............... 219/121.63 |
| 2008/0035619 | A1 | * | 2/2008 | Hamaguchi et al. ...... 219/121.79 |
| 2008/0053968 | A1 | * | 3/2008 | Chang et al. ................ 219/121.6 |
| 2008/0290074 | A1 | * | 11/2008 | Speker et al. ............... 219/121.6 |
| 2008/0314875 | A1 | * | 12/2008 | Yamaguchi et al. ............ 219/68 |
| 2009/0020513 | A1 | * | 1/2009 | O'Halloran et al. ...... 219/121.72 |
| 2009/0064832 | A1 | * | 3/2009 | Caretta et al. ................... 83/76.7 |
| 2009/0078687 | A1 | * | 3/2009 | Idaka et al. .............. 219/121.69 |
| 2009/0183488 | A1 | * | 7/2009 | Namiki et al. ....................... 59/2 |
| 2010/0096512 | A1 | * | 4/2010 | Krastev ........................ 248/67.7 |
| 2011/0259859 | A1 | * | 10/2011 | Dietl et al. ............... 219/121.64 |
| 2013/0020290 | A1 | * | 1/2013 | Epperlein ................... 219/121.6 |

FOREIGN PATENT DOCUMENTS

| | | | | |
|---|---|---|---|---|
| DE | 3826827 | A1 | * | 2/1990 |
| DE | 102008003397 | A1 | | 7/2009 |
| DE | 102010003282 | A1 | * | 9/2011 |
| EP | 0810704 | A2 | | 12/1997 |
| EP | 1108157 | A1 | * | 6/2001 |
| JP | 07050468 | A | * | 2/1995 ............... H05K 3/22 |
| WO | 9908354 | A1 | | 2/1999 |
| WO | 2009086862 | A1 | | 7/2009 |

OTHER PUBLICATIONS

Notification of Transmittal of Translation of the International Preliminary Report on Patentability for corresponding PCT Application No. PCT/EP2011/054707, mailed Oct. 18, 2012, 12 pages.

* cited by examiner

US 9,044,826 B2

LASER PROCESSING MACHINES

CROSS REFERENCE TO RELATED APPLICATIONS

This application is a continuation of and claims priority under 35 U.S.C. §120 to PCT Application No. PCT/EP2011/054707 filed on Mar. 28, 2011, which claimed priority to German Application No. 20 2010 004 852.4, filed on Apr. 9, 2010. The contents of both of these priority applications are hereby incorporated by reference in their entirety.

TECHNICAL FIELD

The present disclosure relates to laser processing machines and related systems.

BACKGROUND

Automated laser processing machines include a large number of control components and/or modules. In some cases, a laser processing machine includes a switch cabinet that is sized to accommodate such control components and/or modules. The switch cabinet often times includes multiple adjacent switch cabinet units that collectively make up the switch cabinet. Some conventional switch cabinets include space-consuming ventilation systems that have ventilation ducts for selectively cooling individual regions of the inner spaces of the switch cabinets.

SUMMARY

The present disclosure relates to a laser processing machine and a switch cabinet that have compact structures.

In one aspect of the invention, a laser processing machine includes a workpiece support, a movement unit that is movable relative to the workpiece support, the movement unit being configured to move a laser processing head over the workpiece support, and a switch cabinet in which one or more control components of the laser processing machine are provided. An arrangement of the switch cabinet provides a free movement space disposed underneath at least a portion of the switch cabinet, wherein at least a portion of the movement unit is disposed within the free movement space. Thus, the laser processing machine advantageously includes an integrated switch cabinet.

In some embodiments, portions of the movement unit of the laser processing head are disposed in the free movement space underneath the switch cabinet at each position of the movement unit relative to the workpiece support. In some examples, the portions of the movement unit can move in an unimpeded manner within the free movement space during movement along a travel path that extends along the workpiece support. A floor space of a switch cabinet of a conventional laser processing machine may be conserved.

In certain embodiments, the movement unit may be disposed within a base region, and the generally fixed switch cabinet is disposed above at least a portion of the movement unit. In some examples, the rigidity of a bearing structure of the movement unit is important to the mechanical stability of modern laser processing machines. In some examples, modern movement units can allow laser processing heads to achieve very high accelerations. In order to maintain operating precision while processing workpieces at such high accelerations of the laser processing head, a bearing structure of the movement unit should also be sufficiently rigid. Such operating precision is achievable using the laser processing machine of the present disclosure due to the movement unit being positioned near the base, even in spite of the integration of the switch cabinet.

In some embodiments, the switch cabinet includes several separate partial switch cabinet units.

In another aspect of the invention, a switch cabinet for a mechanical system includes an inner space that accommodates control components of the mechanical system and at least one ventilation duct through which cooling air can be selectively supplied to at least a region of the inner space, wherein the at least one ventilation duct is formed at least in portions by at least one channel in a profile-type construction that extends along at least a portion of at least one side of the inner space. Thus, the switch cabinet has a compact structural form.

Embodiments can include one or more of the following advantages.

In some embodiments, the movement unit includes a laser processing head carrier and a line guiding device that is movably coupled to the laser processing head carrier. In some examples, it is advantageous for the movement unit to include a laser processing head carrier in the form of a movable extension arm or a movable transverse carrier that extends at least in part over the workpiece support. Since the laser processing head is supported on the laser processing head carrier, multiple supply lines for the laser processing head are generally guided by the laser processing head carrier.

In certain embodiments, a line guiding device serves to guide the supply lines from a fixed component of the laser processing machine to the movable laser processing head carrier. In some embodiments, the line guiding device is an energy guide chain. At one end, the line guiding device is secured to the laser processing head carrier and, at the other end, to a fixed component of the laser processing machine. If the laser processing head carrier is moved (e.g., during workpiece processing), the line guiding device is moved with the laser processing head. The line guiding device travels through a substantial structural portion of the laser processing machine during such movement. The structural portion is formed in a space-saving configuration at least partially by the free movement space underneath the switch cabinet. In some embodiments, the line guiding device is disposed substantially within the free movement space over its entire travel path.

In some embodiments, the laser processing head carrier may be disposed at least partially within the free movement space underneath the switch cabinet.

In certain embodiments, both a portion of the movement unit and a portion of the bearing structure of the movement unit are disposed underneath the switch cabinet. In some examples, since the bearing structure of the movement unit forms at least a portion of the machine base member, at least a portion of the machine base member is also disposed underneath the switch cabinet.

In some embodiments, the laser processing machine includes a free movement space that is protected in a simple and compact manner. Accordingly, the movement unit is, in some examples, movably supported by at least one bearing structure that extends along at least one side of the workpiece support. The bearing structure may protrude, for example, beyond the workpiece support such that the bearing structure provides a partition wall behind which a portion of the free movement space formed underneath the switch cabinet. Components that are disposed within the free movement space (e.g., an energy guide chain), are substantially protected by the partition wall from emissions produced in the working space of the laser processing machine that is disposed above the workpiece support.

In certain embodiments, the switch cabinet forms a portion of the side wall of the laser processing machine, thus providing good accessibility to the switch cabinet even though the switch cabinet is integrated into the laser processing machine. In some embodiments, the laser processing machine includes an enclosure, and the switch cabinet forms a portion of the enclosure. Such a configuration provides a self-contained laser processing machine in which the switch cabinet is integrated to some extent. The switch cabinet and/or carrier elements of the switch cabinet advantageously serve to secure components of a machine housing or of the enclosure.

In some embodiments, the switch cabinet includes at its bottom side a carrier platform under which the free movement space is defined at least in portions. The switch cabinet further includes a stable bearing. In some examples, the support provided to the switch cabinet by the carrier platform allows the switch cabinet and the carrier platform to be supported independently of each other.

In certain embodiments, the carrier platform of the switch cabinet is supported at its bottom side independently of the machine base member or of the movement unit, providing vibration-decoupled support. Alternatively, the carrier platform can be supported by the machine base member or by the bearing structure of the movement unit via damping elements.

In some embodiments, the carrier platform may be supported independently from or by the bearing structure of the movement unit, which provides certain advantages during transport of the laser processing machine. For example, during transport, the laser processing machine sometimes experiences powerful shocks. A structure that supports the carrier platform of the switch cabinet at its bottom side may be constructed in a manner that does not provide the carrier platform with a level of stability that can prevent damage in such instances. Therefore, the switch cabinet is advantageously supported during transport on the generally substantially more stable bearing structure of the movement unit. After transport (e.g., during installation of the laser processing machine), the carrier platform may then be supported independently on the floor in order to prevent vibrations from being transferred from the movement unit to the switch cabinet.

In certain embodiments, a large free movement space is formed underneath the switch cabinet if the carrier platform for the switch cabinet is supported on its bottom side by at least two support arrangements that in part define the free movement space formed underneath at least a portion of the switch cabinet. Such a configuration provides a bridge-like carrier structure for the switch cabinet.

A laser processing machine that has a compact switch cabinet is provided in that a carrier platform for the switch cabinet has at least one cable duct and/or ventilation duct. Structural elements that are to be accommodated in the inner space of a conventional switch cabinet can therefore be arranged in the carrier platform in a space-saving manner.

In some embodiments, the supply of cooling air is carried by at least one ventilation duct in the carrier platform of the switch cabinet, thereby effectively cooling the inner space of the switch cabinet. The cooling air is supplied to the inner space of the switch cabinet through supply openings (e.g., nozzle-shaped supply openings) disposed on the bottom side. The supply openings may be provided in regions of the inner space of the switch cabinet that have structural elements that must be cooled intensively.

The required total cooling power may be reduced due to the flow of cooling air, which is optimized in the described manner. Furthermore, at least individual supply openings may be opened and closed in accordance with requirements. In certain embodiments, closure means provided with a controllable actuation drive are provided in order to open and close individual supply openings in a controlled manner in accordance with requirements.

In some embodiments, the carrier platform of the switch cabinet includes multiple longitudinal struts, which provide a compact and simultaneously stable construction. In some examples, at least one of the longitudinal struts forms a partition wall between two longitudinal channels of the carrier platform. Accordingly, the longitudinal struts advantageously provide more than one functionality.

In certain embodiments, the carrier platform of the switch cabinet acting as a carrying structural element includes at least one profile member that extends in the longitudinal direction of the carrier platform. The profile member is constructed in such a manner that at least one longitudinal surface portion of the profile member forms a longitudinal strut that simultaneously acts as a partition wall between two longitudinal channels of the carrier platform. Accordingly, such a configuration provides a compact and stable carrier platform that has a profile-type construction.

It will be appreciated that the above-described embodiments of a switch cabinet (e.g., the profile-type construction described above and below with respect to a carrier platform of the switch cabinet) provide advantages that are independent of the switch cabinet installation within a particular mechanical system.

Other aspects, features, and advantages will be apparent from the description, the drawings, and the claims.

DETAILED DESCRIPTION

Figure 1:
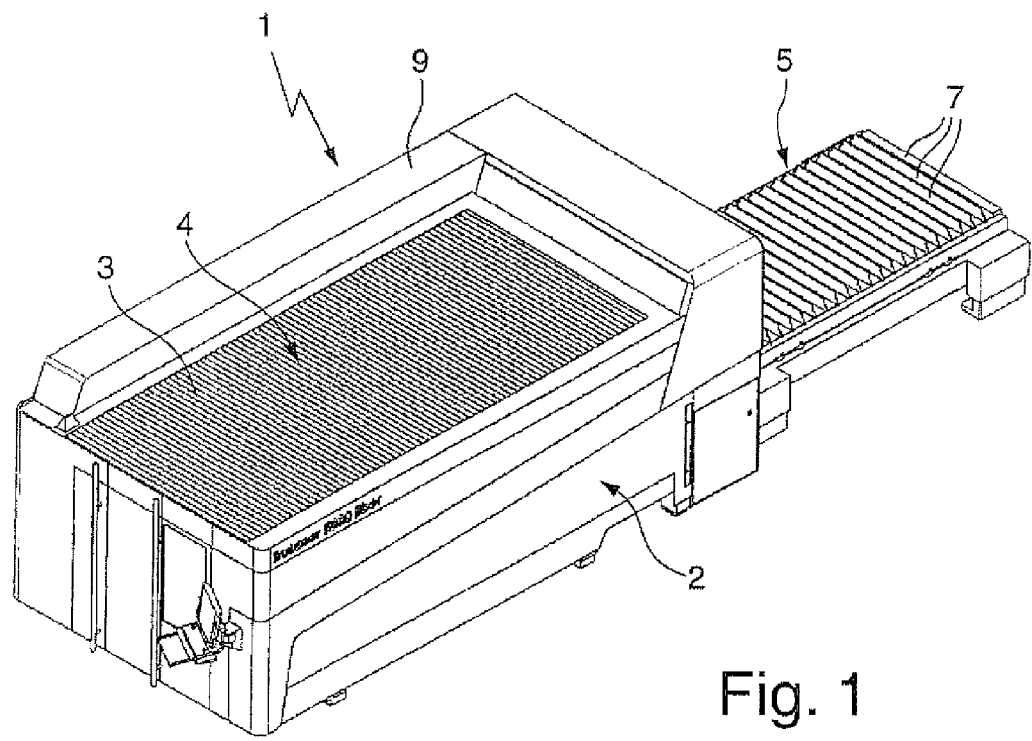
FIG. 1 is a perspective view of a laser processing machine.

FIG. 1 shows a perspective view of a laser processing machine 1 for cutting plate-like workpieces (e.g., metal sheets). A laser processing beam is generated by a solid-state laser resonator and is supplied to the laser processing machine 1 by a laser optical fiber cable (not shown).

The laser processing machine 1 is surrounded on all sides by a radiation protection enclosure 2 that inhibits the escape of radiation from the laser processing machine 1. The laser processing machine 1 also includes a cover 3 that covers the top of an operating space 4 of the laser processing machine 1.

Figure 2:
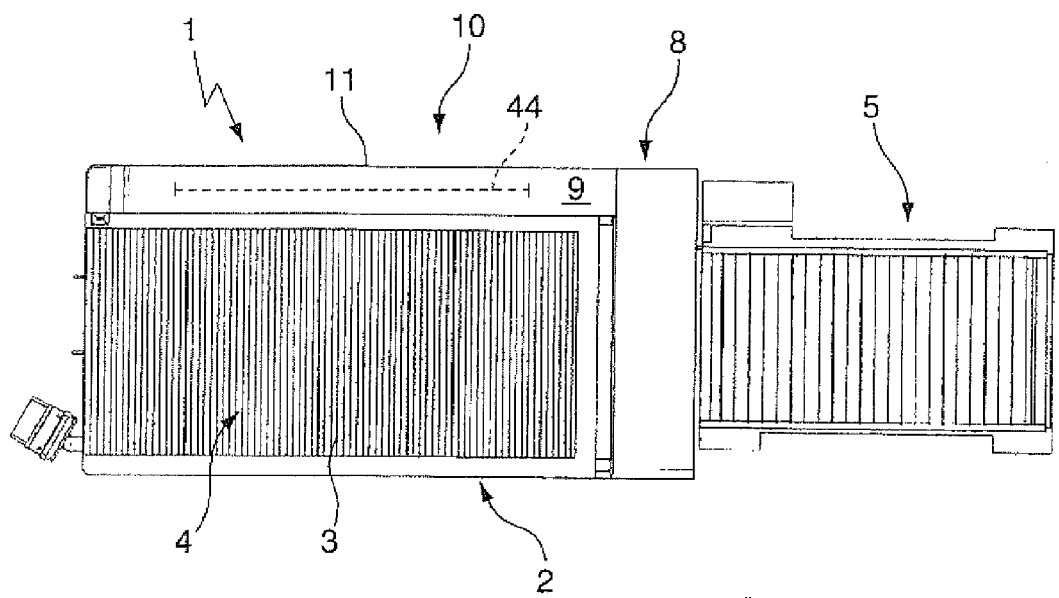
FIG. 2 is a top view of the laser processing machine of FIG. 1.
Figure 3:
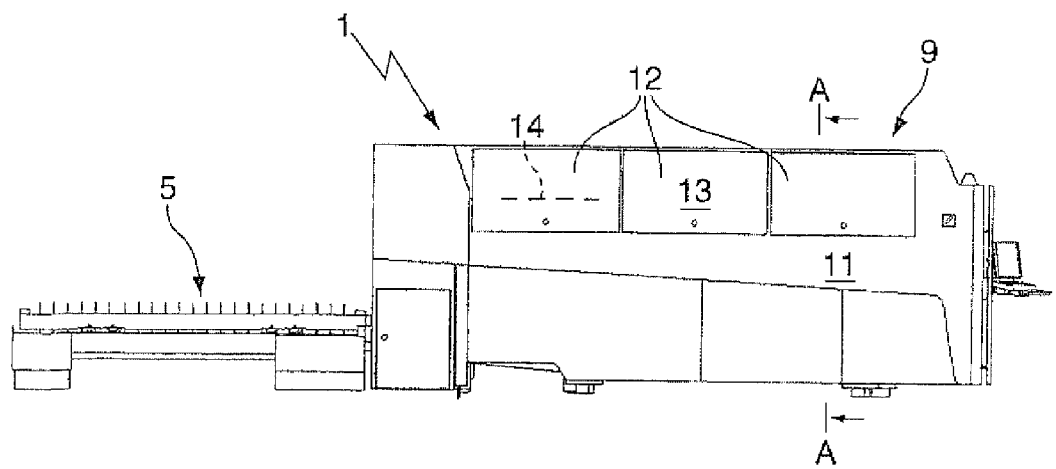
FIG. 3 is a side view of the laser processing machine of FIG. 1.

The laser processing machine 1 further includes a workpiece support 5 that can be moved (e.g., pushed) out of the enclosure 2 as a unit (as shown in FIGS. 1-3). In such a position, the workpiece support 5 is accessible such that metal sheets may be deposited atop the workpiece support 5. The metal sheets can be processed on support webs 7 of the workpiece support 5. The workpiece support 5 may also be used to remove the metal sheets from the laser processing machine once the metal sheets are processed.

FIG. 2 shows a top view of the laser processing machine 1. A floor space 8 of the laser processing machine 1 is relatively small and has a rectangular shape. The size of the floor space 8 is relatively small because a switch cabinet 9 of the laser processing machine 1 is arranged in a space-saving manner inside of the enclosure 2. The switch cabinet 9 extends along substantially an entire longitudinal side 10 of the laser processing machine 1. The switch cabinet 9 forms a portion of a side wall 11 of the laser processing machine 1 and consequently also forms a portion of the enclosure 2 of the laser processing machine 1. Furthermore, a portion of the switch cabinet 9 extends over the cover 3 (as shown in FIG. 1).

FIG. 3 shows a side view of the laser processing machine 1, as viewed facing the side wall 11, a portion of which is formed by the switch cabinet 9. The switch cabinet 9 includes three opening flaps 12 and an inner space 13 that extends in a longitudinal direction 14 of the switch cabinet 9. The inner space 13 is easily observable and readily accessible to a person standing near (e.g., beside) the laser processing machine 1.

Figure 4:
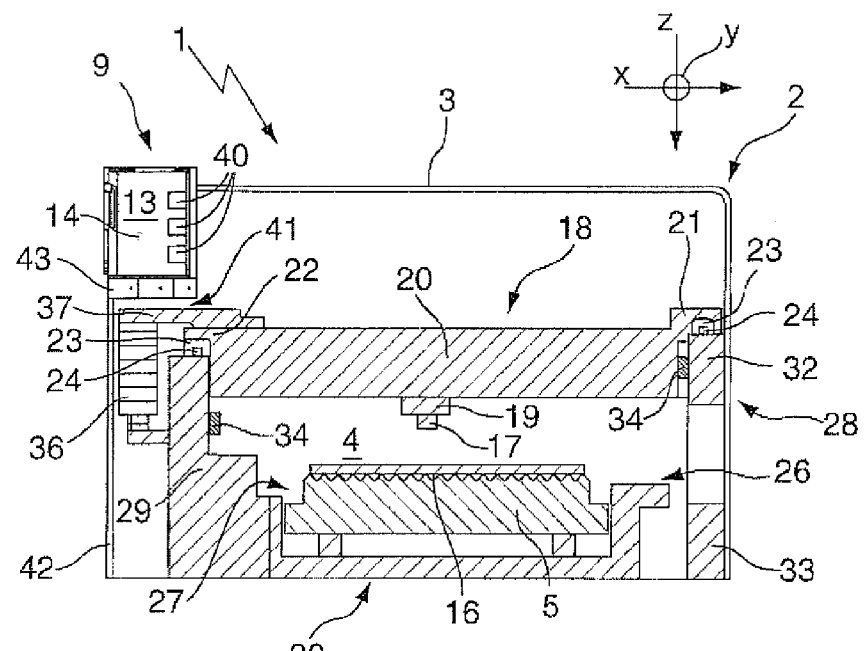
FIG. 4 is a cross-sectional view of the laser processing machine taken along section A-A in FIG. 3.

FIG. 4 shows a schematic cross-sectional view of the laser processing machine 1 along section A-A (shown in FIG. 3). In the illustration of FIG. 4, the workpiece support 5 is disposed inside of the enclosure 2 of the laser processing machine 1. A metal sheet 16 that is to be processed is supported by the workpiece support 5. The workpiece support 5 remains substantially stationary during workpiece processing.

The laser processing machine 1 includes a laser processing head 17 and a movement unit 18 that is movable relative to the workpiece support 5. The movement unit 18 provides for movement of the laser processing head 17 and accordingly provides for relative movement between the laser processing head 17 and the metal sheet 16 that is supported by the workpiece support 5. The laser processing head 17 can be moved by the movement unit 18 over the workpiece support 5 along three linear movement axes x, y, and z, which extend perpendicularly to one another. The laser processing head 17 is supported by a z-axis housing 19, which provides for movement along the z-axis. The z-axis extends perpendicularly to the metal sheet 16. The z-axis housing 19 can be moved along a transverse carrier 20 (e.g., a laser processing head carrier, as shown in the embodiment of FIG. 4) together with the laser processing head 17 along the x-axis, which extends parallel to the metal sheet 16. Furthermore, the transverse carrier 20 can be moved with the laser processing head 17 along the y-axis, which extends parallel to the metal sheet 16 and perpendicularly to the plane of the drawing shown in FIG. 4.

The movable transverse carrier 20 extends along the x-axis over the entire workpiece support 5. Ends 21, 22 of the transverse carrier 20 are each displaceable on and supported by guide carriages 23 that engage guide rails 24. The guide rails 24 are arranged on bearing structures 28, 29 that extend along longitudinal sides 26, 27 of the workpiece support 5, respectively. The bearing structures 28, 29 form a portion of a machine base member 30 of the laser processing machine 1.

The bearing structure 29 is a closed steel construction. The bearing structure 28 is provided in part by a longitudinal carrier 32, which is supported at its ends by an additional longitudinal carrier 33 disposed along a bottom side of the laser processing machine 1. Rack and pinion drives serve to drive the transverse carrier 20 along the y-axis. Motor-driven pinions (not shown) of the rack and pinion drives engage toothed racks 34 that are laterally secured to the bearing structures 28, 29.

Still referring to FIG. 4, the movement unit 18 further includes an energy guide chain 36, which can serve as a line guiding device. The energy guide chain 36 is secured to the end 22 of the transverse carrier 20 by a carrier 37. Accordingly, the energy guide chain 36 is movably coupled to the transverse carrier 20. The other end of the energy guide chain 36 is fitted to the bearing structure 29 in a stationary manner. The energy guide chain 36 serves to guide supply lines, such as electric current and data transmission cables, gas lines, water lines, and other lines, from the fixed bearing structure 29 to the movable transverse carrier 20. For example, a laser optical fiber cable (not shown) is supplied to the transverse carrier 20 by the energy guide chain 36 and further directed to the laser processing head 17. A laser processing beam may be directed to the laser processing head 17 via the laser optical fiber cable.

The switch cabinet 9 of the laser processing machine 1 accommodates several control components 40 of the laser processing machine 1 and is arranged such that a free movement space 41 is disposed underneath the switch cabinet 9. The free movement space 41 is in part defined by covering plates 42, which form a portion of the enclosure 2. The covering plates 42 are suspended from a carrier platform 43 of the switch cabinet 9. Furthermore, a side of the cover 3 of the laser processing machine 1 is secured to the switch cabinet 9.

The energy guide chain 36 is movably disposed within the free movement space 41 under the switch cabinet 9. A portion of the carrier 37 and the end 22 of the transverse carrier 20 are additionally disposed in the free movement space 41 underneath the switch cabinet 9. Furthermore, a portion of the bearing structure 29 (and accordingly, a portion of the machine base member 30 of the laser processing machine 1) is disposed underneath the switch cabinet 9.

At least the portion of the free movement space 41 that houses the energy guide chain 36 is separated from the operating space 4 of the laser processing machine 1 by a portion of the bearing structure 29. The bearing structure 29 forms a partition wall between such portion of the free movement space 41 and the operating space 4. Accordingly, the energy guide chain 36 and the supply cables secured thereto are thereby protected from emissions that may be generated during processing of the workpiece.

Figure 5:
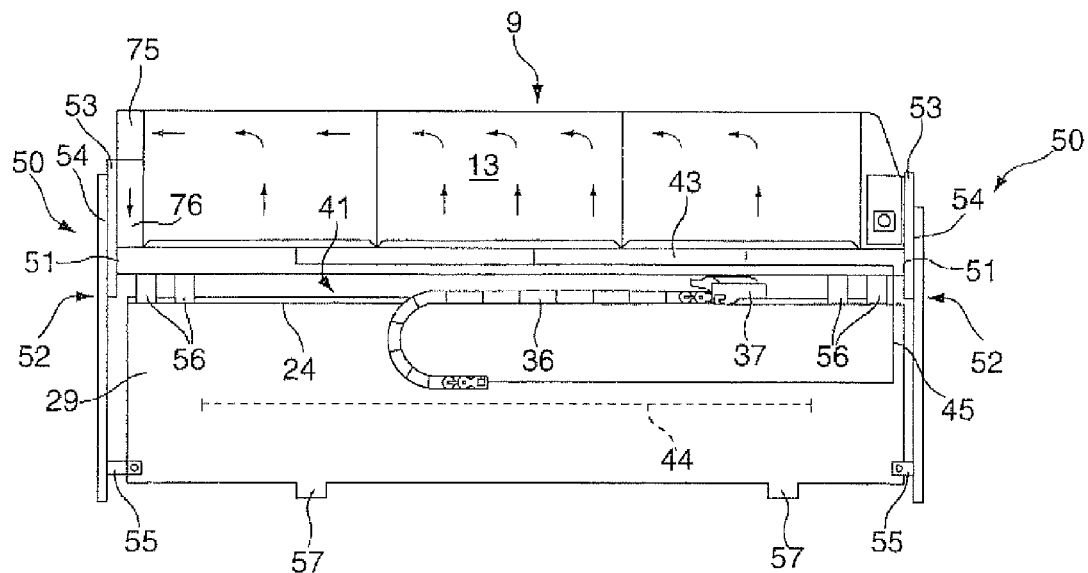
FIG. 5 is a side view of the laser processing machine of FIG. 1 after a portion of an enclosure of the laser processing machine has been removed.

FIG. 5 shows a side view of the laser processing machine 1 and omits the covering plates 42 that are disposed underneath the switch cabinet 9. At least a portion of the free movement space 41 extends over the entire length of the switch cabinet 9. The energy guide chain 36, the carrier 37, and the end 22 of the transverse carrier 20 can be moved in an unimpeded manner in the free movement space 41 over an entire travel path 44 (shown in FIGS. 2 and 5) along the length of the switch cabinet 9.

One or more of the supply lines that are guided by the energy guide chain 36 extend along a path 45 into the inner space 13 of the switch cabinet 9.

The switch cabinet 9 includes a bridge-like carrier structure 50. On its bottom side, the switch cabinet 9 includes the carrier platform 43, which is of a plate-like form and which extends over the entire length and width of the switch cabinet 9. The switch cabinet 9 is supported on its bottom side by a support arrangement 52 that is disposed at each transverse side 51 of the carrier platform 43. The support arrangements 52 in part define the free movement space 41. The arrangement of the carrier platform 43 and the support arrangements 52 form the bridge-like carrier structure 50.

In alternative embodiments, the carrier platform 43 may also be supported at the bottom side of the switch cabinet 9 along the longitudinal side 10 (shown in FIG. 2) of the laser processing machine 1. In such an embodiment, the floor space 8 of the laser processing machine 1 may accordingly be widened to accommodate such a configuration.

Still referring to FIG. 5, the support arrangements 52 each include a support plate 53 and an upright member 54. The carrier platform 43 is secured directly to the support plate 53, which is itself supported by the upright member 54. The upright member 54 is secured to the bearing structure 29 by a fixing lug 55 that prevents lateral slipping.

Two additional support elements 56 are provided between the bearing structure 29 and the carrier platform 43 in the region of each end portion of the carrier platform 43. The support elements 56 are secured to an upper side of the bearing structure 29 so as to be laterally and outwardly offset from the guide rail 24 for the transverse carrier 20. At end sides, the support elements 56 define the portion of the free movement space 41 formed between the bearing structure 29 and the carrier platform 43 of the switch cabinet 9.

The support elements 56 allow the carrier platform 43 and accordingly the switch cabinet 9 to be supported by the bearing structure 29 during transport of the laser processing machine 1. Therefore, damage to the support arrangements 52 that may be caused by shock during transport of the laser processing machine 1 may be substantially prevented.

During installation of the laser processing machine 1, the switch cabinet 9 with the carrier platform 43 is lifted from the support elements 56 and is subsequently supported solely by the support arrangements 52. The bearing structure 29 is supported on the bottom side by two upright elements 57. The separate support of the switch cabinet 9 and the bearing structure 29 at the bottom side effectively results in decoupling of the switch cabinet 9 from the bearing structure 29 and from the movement unit 18 with respect to vibration.

In alternative embodiments, the support elements may include damping elements that protect the switch cabinet 9 from vibrations without the switch cabinet 9 being supported separately from the bearing structure 29 on its bottom side.

Figure 6:
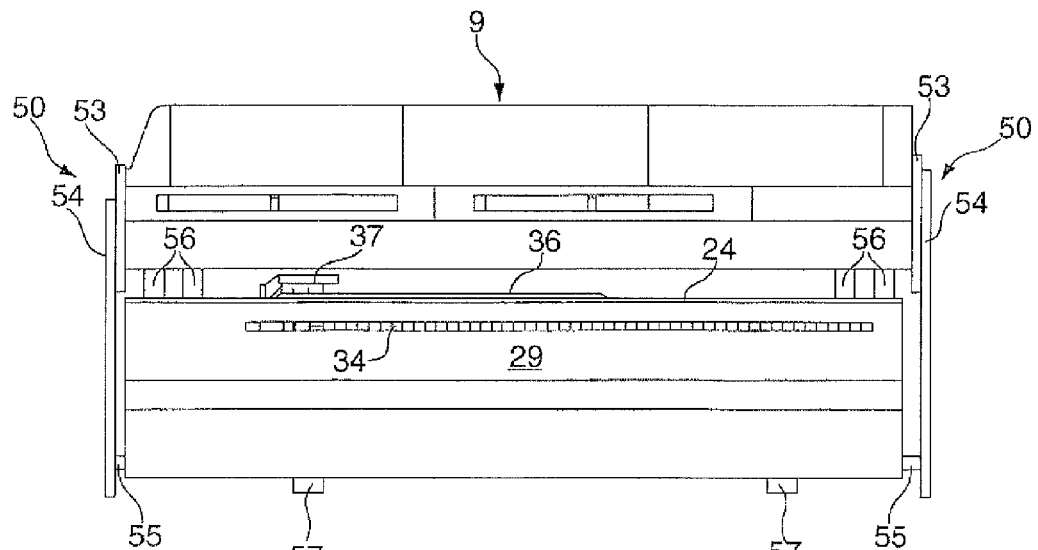
FIG. 6 is an internal view of the laser processing machine of FIG. 1.

FIG. 6 shows an internal view of the laser processing machine 1. In particular, an internal view of the bearing structure 29 of the transverse carrier 20 and the switch cabinet 9 including the carrier structure 50 is illustrated, and several other components are omitted for clarity.

Figure 7:
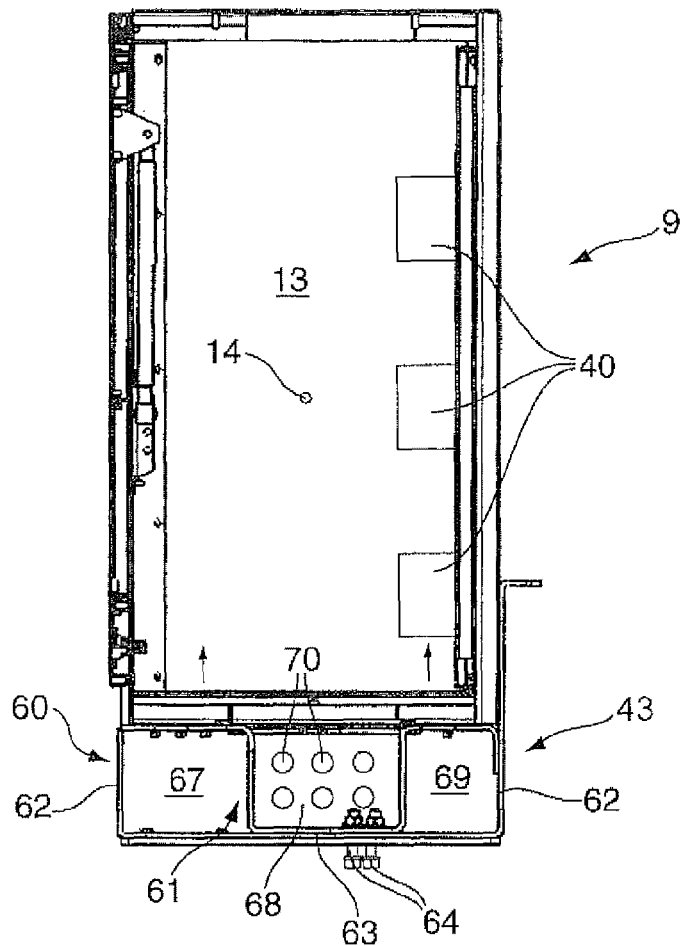
FIG. 7 is a cross-sectional view of a switch cabinet of the laser processing machine of FIG. 1, including a carrier platform of the switch cabinet.
Figure 8:
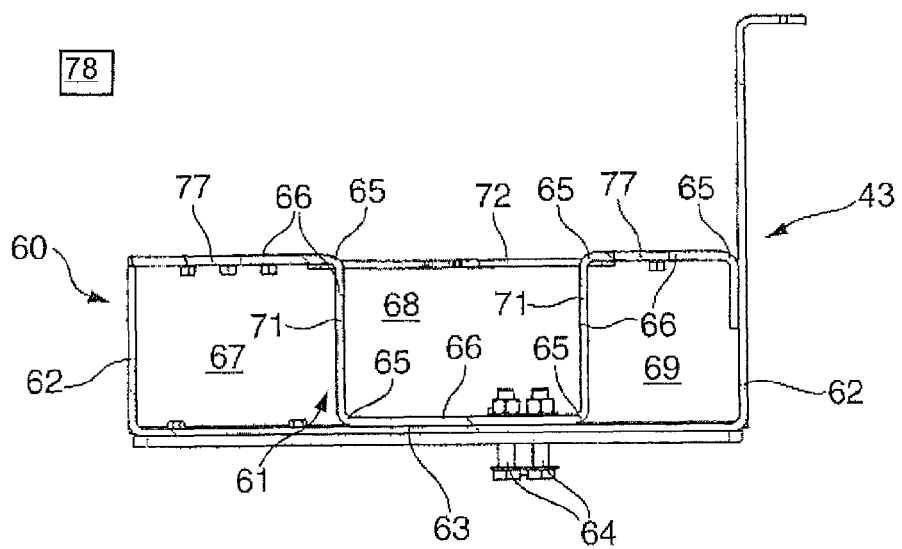
FIG. 8 is a cross-sectional view of the carrier platform of FIG. 7.

FIG. 7 is a cross-sectional view of the switch cabinet 9 and the carrier platform 43 thereof along the section A-A shown in FIG. 3. FIG. 8 is a cross-sectional view of the carrier platform 43. Referring to FIGS. 7 and 8, the carrier platform 43 advantageously forms the bottom side of the switch cabinet 9. However, in some embodiments, a switch cabinet housing may also surround the inner space 13 of the switch cabinet 9 at the bottom side of the switch cabinet 9 and be supported by the carrier platform 43.

The carrier platform 43 includes profile members 60, 61, which extend over substantially the entire length of the carrier platform 43. This profile-type construction provides certain technical production advantages. For example, the carrier platform 43 having such a construction extends along at least a portion of at least one side of the inner space 13 of the switch cabinet 9. In particular, the carrier platform 43 extends along the entire lower side of the inner space 13 of the switch cabinet. However, in alternative embodiments, the carrier platform 43 may be constructed in a monolithic manner.

The trough-like profile member 60 forms side walls 62 and a bottom wall 63 of the carrier platform 43. An internal structural profile member 61 is disposed within the trough-like profile member 60 and forms an internal structure of the carrier platform 43. Both profile members 60, 61 are carrying components of the carrier platform 43. The profile members 60, 61 are welded together and are further connected to each other by securing screws 64.

The internal structural profile member 61 includes several longitudinal surface portions 66 that are distinguished from one another by right-angled bent portions 65 (shown in FIG. 8). The longitudinal surface portions 66 are arranged such that three longitudinal channels 67, 68, 69 are formed in the carrier platform 43 and extend in the longitudinal direction 14 of the switch cabinet 9. The external longitudinal channels 67, 69 are surrounded on all four longitudinal sides by one of the profile members 60, 61 and act as ventilation ducts. The centrally positioned longitudinal channel 68 opens towards the inner space 13 of the switch cabinet 9 and receives lines, such as power cables and data transmission cables (individual cables 70 shown in FIG. 7).

Referring particularly to FIG. 8, partition walls 71 of the longitudinal channels 67, 68, 69 are formed by the internal structural profile member 61 and provide longitudinal struts that increase the rigidity of the carrier platform 43 (e.g., stiffen the carrier platform 43). Additionally, the switch cabinet 9 includes several transverse struts 72, which are arranged in the longitudinal direction 14 of the switch cabinet 9 and increase the stability of the carrier platform 43.

The longitudinal channels 67, 69 are fluidly connected to a heat exchanger 75 and an air recirculation device 76 (shown in FIG. 5), which are accommodated separately in an end portion of the switch cabinet 9. Cooling air may be supplied to the inner space 13 of the switch cabinet 9 by supply openings 77 that are distributed across the longitudinal surface portions 66 of the internal structural profile member 61 facing the inner space 13. A large number of the supply openings 77 are provided within regions of the switch cabinet 9 that are intended to be intensively cooled. Arranging the supply openings 77 in such positions allows for optimal adjustment of the flow relationships (illustrated by arrows that denote air circulation in FIG. 5) in the inner space 13 of the switch cabinet 9. Additionally, closure means (not shown) are provided with a controllable actuation drive 78 and serve to open and close the supply openings 77 individually.

In certain embodiments, the inner space 13 of the switch cabinet 9 may be subdivided into sections in a longitudinal direction 14 by individual partition walls. The intensity of the air cooling can be optimally adjusted in such individual sections by the supply openings 77 (e.g., by the number of supply openings) provided therein. In such embodiments, in order to further allow circulation of the cooling air to the heat exchanger 75 (shown in FIG. 5), the partition walls provide a flow channel that extends continuously and freely in a longitudinal direction 14 in an upper portion of the inner space 13 of the switch cabinet 9.

It will be appreciated that the advantages provided by the switch cabinet 9, the carrier structure 50, and the arrangement of the carrier platform 43 can be achieved irrespective of a specific installation of the switch cabinet 9 that is performed for a particular mechanical system.

A number of embodiments have been described. Nevertheless, it will be understood that various modifications may be made without departing from the spirit and scope of the disclosure. Accordingly, other embodiments are within the scope of the following claims.

What is claimed is:

1. A laser processing machine, comprising:
a workpiece support;
a movement unit comprising a transverse carrier that extends above and across the workpiece support and a line guiding device provided as an energy guide chain that is movably coupled to the transverse carrier;
a laser processing head that is movably coupled to the transverse carrier such that the laser processing head can be guided along the transverse carrier in a longitudinal direction thereof;
a bearing structure that extends along at least one side of the workpiece support and perpendicularly relative to the transverse carrier, the bearing structure supporting the transverse carrier such that the transverse carrier, together with the laser processing head, can move along the bearing structure and along the workpiece support; and
a switch cabinet in which one or more control components of the laser processing machine are provided,
wherein the transverse carrier and the bearing structure are disposed below the switch cabinet, and
wherein the switch cabinet provides a free movement space disposed thereunderneath and above the transverse carrier and the bearing structure, such that at least a portion of the transverse carrier and at least a portion of the bearing structure are disposed within the free movement space, and such that the transverse carrier is movable within the free movement space along the bearing structure and along the workpiece support, and wherein at least a portion of the line guiding device is disposed within the free movement space.

2. The laser processing machine according to claim 1, wherein the bearing structure separates at least a portion of the free movement space from an operating space of the laser processing machine extending over the workpiece support.

3. The laser processing machine according to claim 1, wherein the switch cabinet forms a portion of a side wall of the laser processing machine.

4. The laser processing machine according to claim 3, further comprising an enclosure that includes the side wall, and wherein the switch cabinet forms a portion of the enclosure.

5. The laser processing machine according to claim 1, wherein the switch cabinet comprises a carrier platform.

6. The laser processing machine according to claim 5, wherein the bearing structure is supported on a floor of the laser processing machine, and wherein the carrier platform is supported on the floor independently from the bearing structure.

7. The laser processing machine according to claim 5, wherein the bearing structure is supported on a floor of the laser processing machine, and wherein the carrier platform is supportable on the floor independently from or by the bearing structure.

8. The laser processing machine according to claim 5, wherein the carrier platform is supported on a floor of the laser processing machine by at least two support arrangements that define at least a portion of the free movement space.

9. The laser processing machine according to claim 5, wherein the carrier platform comprises at least one cable duct and/or at least one ventilation duct.

10. The laser processing machine according to claim 9, wherein the carrier platform comprises at least one ventilation duct through which an inner space of the switch cabinet can be supplied with cooling air via supply openings.

11. The laser processing machine according to claim 10, wherein the supply openings are nozzle-shaped.

12. The laser processing machine according to claim 10, further comprising a controllable actuation drive that is operable to open and close the supply openings individually.

13. The laser processing machine according to claim 5, wherein the carrier platform comprises a plurality of longitudinal struts, and wherein at least one of the longitudinal struts forms a partition wall between two longitudinal channels of the carrier platform.

14. The laser processing machine according to claim 5, wherein the carrier platform comprises at least one profile member that extends in a longitudinal direction of the switch cabinet, and wherein at least one longitudinal surface portion of the profile member forms a longitudinal strut that acts as a partition wall between two longitudinal channels of the carrier platform.

15. The laser processing machine according to claim 14, wherein the longitudinal strut formed by the at least one longitudinal surface portion of the profile member is configured to stiffen the carrier platform.

16. The laser processing machine according to claim 1, wherein the transverse carrier is formed as an extension arm.

* * * * *